3,826,824
INHIBITION OF GASTROINTESTINAL ULCERS WITH CALCITONIN

Wolfgang Doepfner, Basel, Switzerland, assignor to Sandoz Ltd., also known as Sandoz AG, Basel, Switzerland
No Drawing. Filed July 11, 1972, Ser. No. 270,811
Claims priority, application Switzerland, July 16, 1971, 10,484/71
Int. Cl. A61k 27/00
U.S. Cl. 424—112
6 Claims

ABSTRACT OF THE DISCLOSURE

This invention concerns a method of preventing ulcers in the gastrointestinal system of mammals, comprising administration of a peptide hormone selected from the group consisting of porcine calcitonin, human calcitonin M and salmon calcitonin.

---

The present invention relatees to peptide hormones and more particularly to porcine calcitonin, human calcitonin M and salmon calcitonin.

The above stated specific peptide hormones have been described in the literature and their indicated used in the treatment of osteoporosis, Paget's disease and hypercalcemia has also been described.

It has now been found that the above-mentioned specific peptide hormones are useful in preventing the formation or spread of ulcers in the gastrointestinal system, particularly the spread or formation of such ulcers following on intestinal secretion disorders or exogenous pancreas secretion disorders. This utility is indicated by standard tests, for example, in the wake cat, in accordance with the following test method, viz: A 48 hour infusion of pentagastrin at a dose of 16 γ/kg. animal body weight results in a substantial ulcer-releaseing effect on the gastrointestinal system. Simultaneous infusion of the above-mentioned peptide hormones at a dose between 0.01 and 1 γ/kg. animal body weight per hour results in a dose-dependent inhibition of ulcer formation or spread, as the case may be.

The dose to be administered will vary depending on the desired effect and mode of administration. In general however, satisfactory results are obtained with a daily dosage of 0.01 and 100γ of peptide hormone per kg. animal body weight. For larger mammals, the daily dosage is in the range of from 0.70 to 700γ of the peptide hormone aside from suitable pharmaceutical carriers or diluents.

The method of the invention is particularly suitable in preventing the formation or spread of ulcers in the gastrointestinal system in mammals particularly prone to the formation or spread of ulcers, e.g. a mammal, with or without an existing ulcer or ulcers, having an intestinal secretion disorder or exogenous pancrease secretion disorder.

For the above-mentioned use, the peptide hormones are generally administered parenterally. For such mode of administration the peptide hormones may be employed in a pharmaceutical composition, in association with a sterile liquid pharmaceutical carrier or diluent. Other forms of composition for parenteral administration may also be employed, e.g. sustained release form for subcutaneous insertion, incorporating a suitable vehicle.

It will be appreciated by those skilled in the art that the conventional excipients may be employed in pharmaceutical compositions for use in the method of the invention, e.g. stabilizers, buffer agents, wetting agents, suspension agents and preservatives, which may also serve as carriers or diluents when appropriate.

The peptide hormones which may be employed in the method of the invention exist in free base, pharmaceutically acceptable acid addition salt form, e.g. formed from acetic acid, hydrochloric acid or phosphoric acid, or pharmaceutically acceptable heavy metal complex form, e.g. the complex formed with $ZN^{\oplus\oplus}$. Also such forms exhibit the same type of activity and the same daily dosage range is applicable in all these cases. It is therefore to be understood that all such forms of the peptide hormones are embraced within the scope of the present invention. It is preferred that the peptide hormones employed in the method of the invention be in water-soluble form, e.g. in pharmaceutically acceptable acid addition salt form.

The invention is illustrated with reference to the following examples.

EXAMPLE 1

Salmon calcitonin

The composition of an ampoule containing salmon calcitonin is as follows:

| Constituents: | Weight |
|---|---|
| Synthetic salmon calcitonin (polyacetate, polyhydrate) | 0.0000725 g.[1] |
| Glacial acetic acid | 0.0020 g. |
| Sodium acetate | 0.0020 g. |
| Sodium chloride | 0.00750 g. |
| Water for injection, 1.0 ml. up to | 1.0040 g. |
| | 1.0 ml. |

[1] Corresponding to 0.000050 g. of synthetic salmon calcitonin.

All of the above constituents are in sterile condition. The ampoules may be administered 1 to 5 times daily parenterally to prevent the formation or spread of ulcers in the gastrointestinal system in mammals, with or without an existing ulcer, suffering from an intestinal secretion disorder or exogenous pancreas secretion disorder.

EXAMPLE 2

Porcine calcitonin and human calcitonin M

Replacing the salmon calcitonin constituent of the ampoule of Example 1 with an equal amount of either porcine calcitonin or human calcitonin M, ampoules are obtained which are useful for the same purposes and which may be used in the same manner as indicated in Example 1.

What is claimed is:
1. A method of preventing the formation or spread of ulcers in the gastrointestinal system of a mammal having in intestinal secretion or exogenous pancreas section disorder which comprises parenterally administering to the mammal a therapeutically effective amount of a peptide hormone selected from the group consisting of porcine calcitonin, human calcitonin M and salmon calcitonin, in free base, pharmaceutically acceptable acid addition salt or pharmaceutically acceptable heavy metal complex form.

2. The method of Claim 1, wherein between 0.01 and 100 γkg. animal body weight is administered daily.

3. The method of Claim 2, wherein the peptide hormone is porcine calcitonin.

4. The method of Claim 2, wherein the peptide hormone is human calcitonin M.

5. The method of Claim 2, wherein the peptide hormone is salmon calcitonin.

6. The method of Claim 1, wherein the peptide hormone is in pharmaceutically acceptable acid addition salt form.

References Cited

UNITED STATES PATENTS 3,590,027  6/1971  Grinnan et al. _____ 260—112

OTHER REFERENCES

*Chemical Abstracts*, vol. 63 (1965), 4103.

ALBERT T. MEYERS, Primary Examiner

F. E. WADDELL, Assistant Examiner